United States Patent
Tokito (10) Patent No.: US 10,840,664 B2
(45) Date of Patent: Nov. 17, 2020

(54) LASER CUTTING DEVICE, METHOD OF DIAGNOSING LASER OSCILLATOR AND COMPUTER-READABLE RECORDING MEDIUM

(71) Applicant: FANUC CORPORATION, Yamanashi (JP)

(72) Inventor: Hiroaki Tokito, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 288 days.

(21) Appl. No.: 15/887,425

(22) Filed: Feb. 2, 2018

(65) Prior Publication Data
US 2018/0233871 A1    Aug. 16, 2018

(30) Foreign Application Priority Data
Feb. 15, 2017   (JP) .................................. 2017-025975

(51) Int. Cl.
*H01S 3/00* (2006.01)
*H01S 3/10* (2006.01)
(Continued)

(52) U.S. Cl.
CPC ........ *H01S 3/0014* (2013.01); *B23K 26/0626* (2013.01); *B23K 26/38* (2013.01);
(Continued)

(58) Field of Classification Search
CPC .. B23K 26/705; B23K 26/38; B23K 26/0626; B23K 26/00; B23K 26/14; H01S 3/0014;
(Continued)

(56) References Cited

U.S. PATENT DOCUMENTS 9,585,570 B2 * 3/2017 Suzuki ................ A61B 5/0095
10,461,488 B2 * 10/2019 Nishio ................... G01K 13/00
(Continued)

FOREIGN PATENT DOCUMENTS

CN    102117053 A    7/2011
CN    102658431 A    9/2012
(Continued)

OTHER PUBLICATIONS

An Office Action; "Notification of Reasons for Refusal" issued by the Japanese Patent Office dated Jul. 10, 2018, which corresponds to Japanese Patent Application No. 2017-025975 and is related to U.S. Appl. No. 15/887,425.
(Continued)

*Primary Examiner* — Paul R Durand
*Assistant Examiner* — Andrew P Bainbridge
(74) *Attorney, Agent, or Firm* — Studebaker & Brackett PC (57) ABSTRACT

A laser cutting device includes a laser oscillator, a cutting nozzle configured to irradiate a work with laser light so as to cut the work, and a controller configured to control the laser oscillator and a drive unit configured to move the cutting nozzle. The controller includes a laser output control unit, a diagnosis performance determination unit configured to determine, when the laser oscillator satisfies a predetermined operation condition, based on a cutting program, whether or not the laser oscillator is diagnosed, and a diagnosis function performance unit configured to issue a laser output command for diagnosis of the laser oscillator to the laser oscillator. When the diagnosis performance determination unit determines that the laser oscillator is diagnosed, the diagnosis performance determination unit outputs the laser output command for diagnosis to the laser oscillator.

8 Claims, 8 Drawing Sheets

(51) Int. Cl.
  *H01S 3/13* (2006.01)
  *B23K 26/06* (2014.01)
  *B23K 26/38* (2014.01)
  *B23K 26/70* (2014.01)

(52) U.S. Cl.
  CPC ........ *B23K 26/705* (2015.10); *H01S 3/10069* (2013.01); *H01S 3/1305* (2013.01); *H01S 3/1306* (2013.01)

(58) Field of Classification Search
  CPC ... H01S 3/10069; H01S 3/1305; H01S 3/1306
  USPC ............. 219/121.61–121.62, 121.67, 121.72
  See application file for complete search history.

(56) References Cited

U.S. PATENT DOCUMENTS

| | | | | |
|---|---|---|---|---|
| 10,473,828 | B2* | 11/2019 | Kyhl | G02B 5/003 |
| 10,608,397 | B2* | 3/2020 | Nelson | H01S 3/0014 |
| 2015/0005599 | A1* | 1/2015 | Suzuki | H01S 3/042 |
| | | | | 600/328 |
| 2018/0015560 | A1* | 1/2018 | Narayanan | B23K 26/38 |
| 2018/0233871 | A1* | 8/2018 | Tokito | B23K 26/38 |
| 2019/0260175 | A1* | 8/2019 | Peng | H01S 3/0014 |
| 2019/0280447 | A1* | 9/2019 | Nelson | H01S 3/13013 |
| 2020/0266603 | A1* | 8/2020 | Nogiwa | H01S 3/1317 |

FOREIGN PATENT DOCUMENTS

| | | |
|---|---|---|
| CN | 104942453 A | 9/2015 |
| DE | 69503178 T2 | 12/1998 |
| JP | H06-000666 A | 1/1994 |
| JP | 2004-130365 A | 4/2004 |
| JP | 2008-114228 A | 5/2008 |
| JP | 2008-229629 A | 10/2008 |
| JP | 2013-239572 A | 11/2013 |
| JP | 2016-206085 A | 12/2016 |

OTHER PUBLICATIONS

An Office Action mailed by the State Intellectual Property Office of the People's Republic of China dated Dec. 6, 2019, which corresponds to Chinese Patent Application No. 201810143123.9 and is related to U.S. Appl. No. 15/887,425.

An Office Action mailed by the German Patent Office dated Jul. 2, 2020, which corresponds to German Patent Application No. 102018202041.8 and is related to U.S. Appl. No. 15/887,425; with English language Concise Explanation.

* cited by examiner

LASER CUTTING DEVICE, METHOD OF DIAGNOSING LASER OSCILLATOR AND COMPUTER-READABLE RECORDING MEDIUM

This application is based on and claims the benefit of priority from Japanese Patent Application No. 2017-025975, filed on 15 Feb. 2017, the content of which is incorporated herein by reference.

BACKGROUND OF THE INVENTION

Field of the Invention

The present invention relates to a laser cutting device, a method of diagnosing a laser oscillator and a computer-readable recording medium.

Related Art

In order to stably operate a laser oscillator installed in a laser cutting device in a long term, it is preferable to grasp a variation in the characteristic of an output of the laser oscillator caused by a chronological change. Hence, the output characteristic of the laser oscillator is periodically acquired and recorded. When deterioration of the output characteristic of the laser oscillator is recognized, the initial characteristic of the laser oscillator is maintained such as by change of a parameter for a laser output command value calculation algorithm or adjustment of an excitation power supply.

At present, in order for the output characteristic of the laser oscillator to be acquired and recorded, when a certain condition (for example, the energization time of the laser oscillator is exceeded) is reached, an operator manually performs the acquisition and the recording. However, even if the necessity of the acquisition and the recording of the output characteristic is recognized at an actual site, depending on the conditions of the operation of facilities or the conditions of the arrangement of the operator, the output characteristic of the laser oscillator is not necessarily acquired and recorded with appropriate timing. When a failure occurs without the output characteristic of the laser oscillator being acquired and recorded, it is difficult to acquire the output characteristic for grasping the conditions, with the result that it takes significant time to find the cause and perform restoration.

Patent Document 1 discloses, as a laser cutting device for diagnosing a laser oscillator, a laser cutting device which automatically measures and diagnoses the output power of a laser beam and a lens monitor output at the time of startup of the laser cutting device or at a predetermined period. Patent Document 2 discloses a laser cutting device which starts the diagnosis of a laser oscillator when a command for diagnosis of the laser oscillator is executed.

Patent Document 1: Japanese Unexamined Patent Application, Publication No. 2008-114228
Patent Document 2: Japanese Unexamined Patent Application, Publication No. H06-000666

SUMMARY OF THE INVENTION

However, even when the laser oscillator is diagnosed at the time of startup of the laser cutting device or at a predetermined period, or the diagnosis is performed when the command for diagnosis of the laser oscillator is executed, the diagnosis is not necessarily performed with appropriate timing.

An object of the present invention is to provide a laser cutting device which can automatically diagnose a laser oscillator with appropriate timing, a method of diagnosing the laser oscillator and a computer-readable recording medium.

(1) A laser cutting device (for example, a laser cutting device 10, 11, 12 which will be described later) of the present invention includes:
a laser oscillator (for example, a laser oscillator 40 which will be described later) configured to generate laser light;
a cutting nozzle (for example, a cutting nozzle 70 which will be described later) configured to irradiate a work with the laser light supplied from the laser oscillator so as to cut the work; and
a controller (for example, a controller 20, 21, 22 which will be described later) configured to control the laser oscillator and a drive unit (for example, a servo amplifier 30, a Y axis direction drive servomotor 61, an X axis direction drive servomotor 62 and a Z axis direction drive servomotor 63 which will be described later) configured to move the cutting nozzle along a cutting path commanded by a cutting program,
wherein the controller includes:
a laser output control unit (for example, a laser output control unit 204 which will be described later) configured to issue a laser output command to the laser oscillator;
a diagnosis performance determination unit (for example, a diagnosis performance determination unit 202 which will be described later) configured to determine, when the laser oscillator satisfies a predetermined operation condition, based on the cutting program, whether or not the laser oscillator is diagnosed; and
a diagnosis function performance unit (for example, a diagnosis function performance unit 203 which will be described later) configured to issue a laser output command for diagnosis of the laser oscillator to the laser oscillator, and
when the diagnosis performance determination unit determines that the laser oscillator is diagnosed, the diagnosis performance determination unit outputs the laser output command for diagnosis to the laser oscillator.

(2) In the laser cutting device according to above item (1), when the diagnosis performance determination unit determines that the laser oscillator is diagnosed, the controller may control the drive unit so as to retract the cutting nozzle to a predetermined retraction region (for example, a retraction region 81 which will be described later).

(3) In the laser cutting device according to above item (1) or (2), when the diagnosis performance determination unit detects a predetermined diagnose performance command while the cutting program is being processed, the diagnosis performance determination unit may output the laser output command for diagnosis to the laser oscillator.

(4) In the laser cutting device according to any one of above items (1) to (3), the operation condition may be a predetermined energization time of the laser oscillator.

(5) In the laser cutting device according to any one of above items (1) to (4), the operation condition may be a predetermined number of times the cutting program is executed.

(6) The laser cutting device according to any one of above items (1) to (5) may further include: a first notification unit configured to notify performance of the diagnosis to an operator when the operation condition is about to be satisfied.

(7) In the laser cutting device according to any one of above items (1) to (6), when the diagnosis function performance unit issues the laser output command for diagnosis, the diagnosis function performance unit may output a plurality of laser output commands stepwise in which laser outputs are different.

(8) The laser cutting device according to any one of above items (1) to (7) may further includes: a state monitor unit (for example, a state monitor unit 207 which will be described later) configured to monitor a state of the laser oscillator; a storage unit (for example, a storage unit 208 which will be described later) configured to store data that is output from the state monitor unit and that indicates the state of the laser oscillator; a second notification unit (for example, a notification unit 210 which will be described later); and a notification operation determination unit (for example, a notification operation determination unit 209 which will be described later) configured to determine whether or not the data falls outside a predetermined threshold value range, and which operates the second notification unit when determining that the data falls outside the predetermined threshold value range.

(9) In a method of diagnosing a laser oscillator (for example, a laser oscillator 40 which will be described later) of a laser cutting device (for example, a laser cutting device 10, 11, 12 which will be described later) according to the present invention, the laser cutting device includes: the laser oscillator (for example, a laser oscillator 40 which will be described later) configured to generate laser light; a cutting nozzle (for example, a cutting nozzle 70 which will be described later) configured to irradiate a work with the laser light supplied from the laser oscillator so as to cut the work; and
a drive unit (for example, a servo amplifier 30, a Y axis direction drive servomotor 61, an X axis direction drive servomotor 62 and a Z axis direction drive servomotor 63 which will be described later) configured to move the cutting nozzle along a cutting path commanded by a cutting program,
the method including:
when the laser oscillator satisfies a predetermined operation condition, determining whether or not the laser oscillator is diagnosed based on the cutting program and
when the laser oscillator is diagnosed, issuing a laser output command for diagnosis of the laser oscillator to the laser oscillator.

(10) In a non-transitory computer readable recording medium according to the present invention, the medium being encoded with a program for diagnosis of the laser oscillator, the program causing a computer to serve as a controller of a laser cutting device including:
a laser oscillator (for example, a laser oscillator 40 which will be described later) configured to generate laser light;
a cutting nozzle (for example, a cutting nozzle 70 which will be described later) configured to irradiate a work with the laser light supplied from the laser oscillator so as to cut the work; and
the controller (for example, a controller 20, 21, 22 which will be described later) configured to control the laser oscillator and a drive unit (for example, a servo amplifier 30, a Y axis direction drive servomotor 61, an X axis direction drive servomotor 62 and a Z axis direction drive servomotor 63) configured to move the cutting nozzle along a cutting path commanded by a cutting program,
the program for diagnosis causing the computer to function as:

a laser output control unit (for example, a laser output control unit 204 which will be described later) configured to issue a laser output command to the laser oscillator,
a diagnosis performance determination unit (for example, a diagnosis performance determination unit 202 which will be described later) configured to determine, when the laser oscillator satisfies a predetermined operation condition, based on the cutting program, whether or not the laser oscillator is diagnosed and
a diagnosis function performance unit (for example, a diagnosis function performance unit 203 which will be described later) configured to issue a laser output command for diagnosis of the laser oscillator to the laser oscillator, the program for diagnosis causing the computer to function such that when the diagnosis performance determination unit determines that the laser oscillator is diagnosed, the diagnosis performance determination unit outputs the laser output command for diagnosis to the laser oscillator.

According to the present invention, it is possible to automatically diagnose a laser oscillator with appropriate timing.

DETAILED DESCRIPTION OF THE INVENTION

Embodiments of the present invention will be described in detail below with reference to drawings.

First Embodiment

Figure 1:
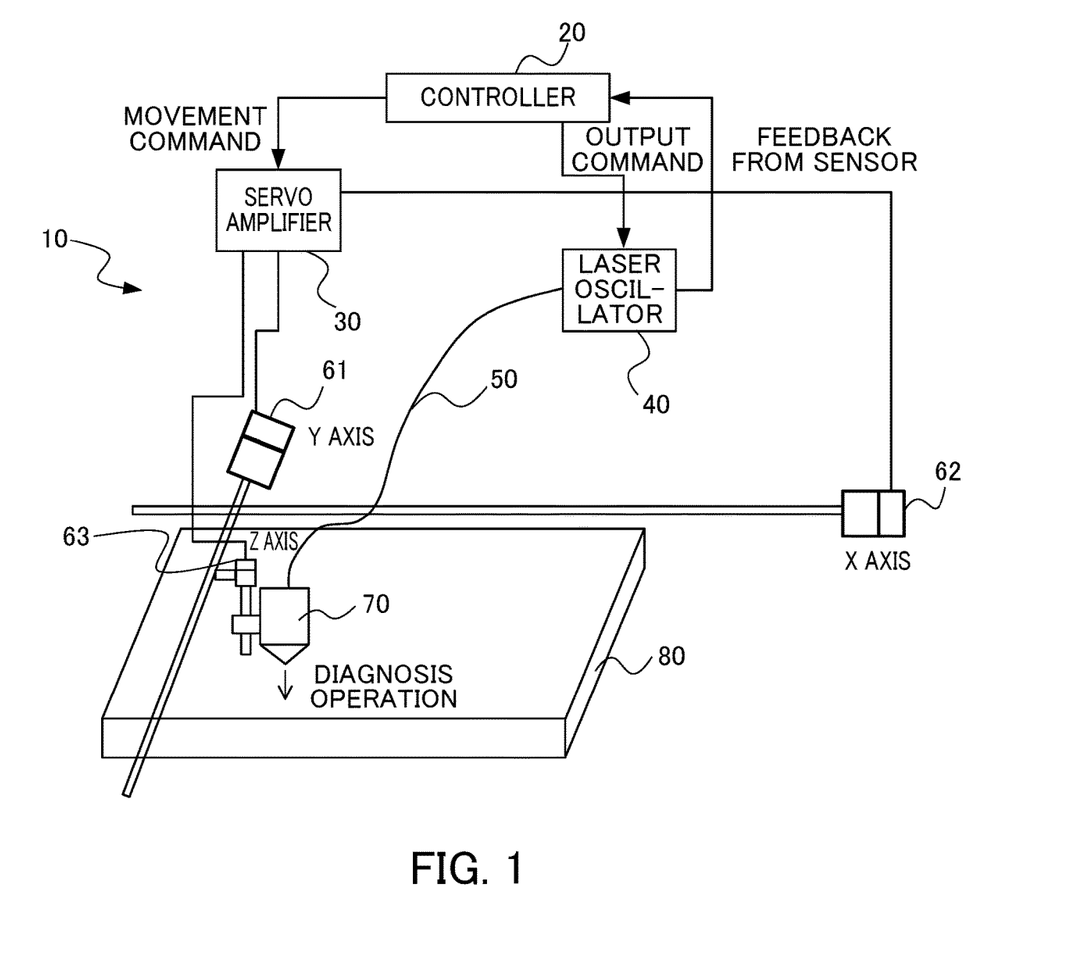
FIG. 1 is a configuration diagram showing the configuration of a first embodiment of a laser cutting device of the present invention.
Figure 2:
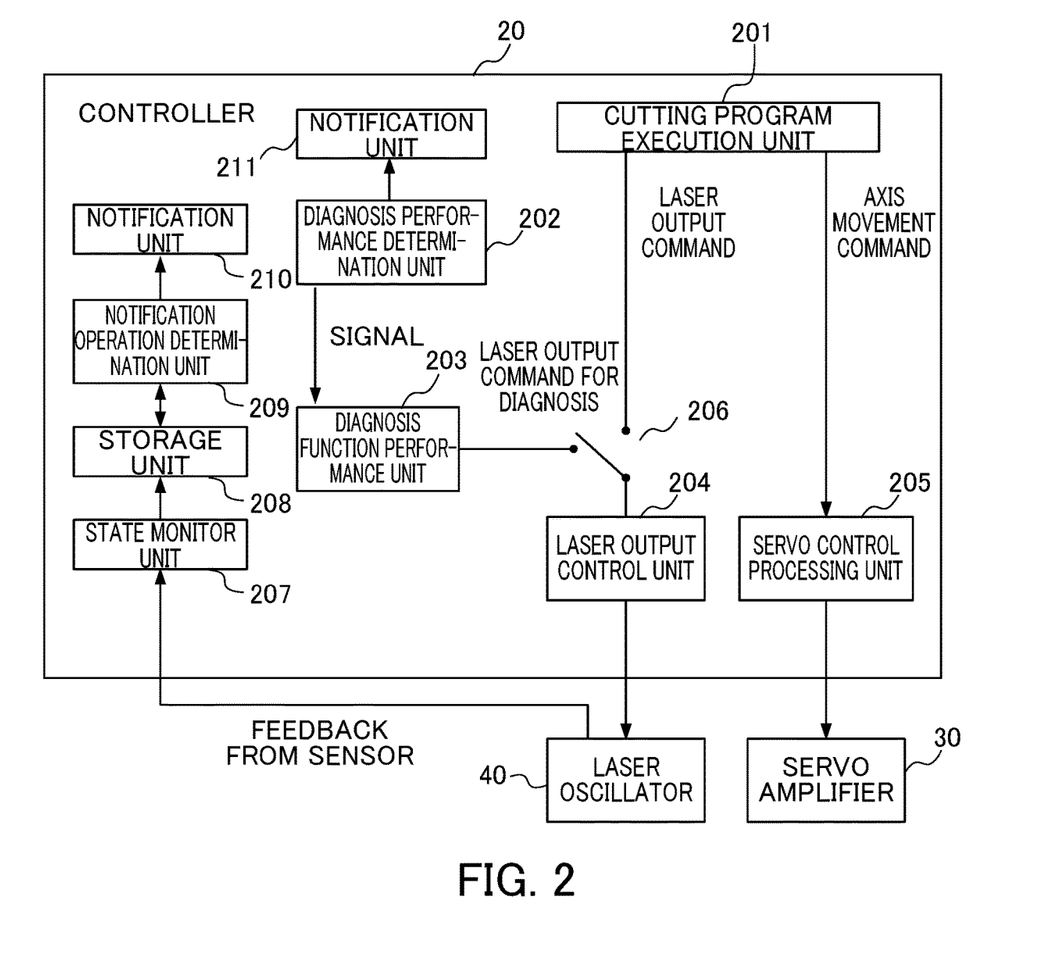
FIG. 2 is a block diagram showing the configuration of a controller in the laser cutting device of the first embodiment.

FIG. 1 is a configuration diagram showing the configuration of a first embodiment of a laser cutting device of the present invention. FIG. 2 is a block diagram showing the configuration of a controller in the laser cutting device of the first embodiment. As shown in FIG. 1, the laser cutting device 10 includes the controller 20, a servo amplifier 30, a laser oscillator 40, a light guide fiber 50, a Y axis direction drive servomotor 61, an X axis direction drive servomotor 62, a Z axis direction drive servomotor 63, a cutting nozzle 70 and a work cutting table 80. The servo amplifier 30, the Y axis direction drive servomotor 61, the X axis direction drive servomotor 62 and the Z axis direction drive servomotor 63 form a drive unit which moves the cutting nozzle 70.

The controller 20 controls the servo amplifier 30 and the laser oscillator 40 based on a cutting program. The servo amplifier 30 receives a movement command from the controller 20 so as to drive the Y axis direction drive servomotor 61, the X axis direction drive servomotor 62 and the Z axis direction drive servomotor 63. The Y axis direction drive servomotor 61, the X axis direction drive servomotor 62 and the Z axis direction drive servomotor 63 move the cutting nozzle 70 in an X axis direction, a Y axis direction and a Z axis direction, respectively. The X axis direction and the Y axis direction are a horizontal direction, and the Z axis direction is a vertical direction. When the cutting nozzle 70 can be moved along a cutting path, the work cutting table 80 may be moved. For example, the Y axis direction drive servomotor 61, the X axis direction drive servomotor 62 and the Z axis direction drive servomotor 63 may move the work cutting table 80 in the X axis direction, the Y axis direction and the Z axis direction.

The laser oscillator 40 receives an output command from the controller 20 so as to generate laser light, and supplies the laser light through the light guide fiber 50 to the cutting nozzle 70. The cutting nozzle 70 irradiates a work (which is also referred to as a workpiece and which is unillustrated) on the work cutting table 80 with the laser light so as to perform drilling, cutting and the like on the work. The laser oscillator 40 receives a laser output command for diagnosis of the laser oscillator 40 from the controller 20 so as to generate the laser light, and supplies the laser light through the light guide fiber 50 to the cutting nozzle 70. The laser oscillator 40 includes, for example, an excitation power supply which provides energy to a laser medium that is a substance serving as a source for the laser oscillation and a mirror which amplifies light generated. The laser oscillator 40 also includes a power sensor which detects a laser output. The power sensor detects the laser output from the laser oscillator 40 so as to feed back a laser output value to the controller 20. A method of detecting the laser output of a laser oscillator installed in a laser cutting device is disclosed in, for example, Japanese Unexamined Patent Application, Publication No. 2004-25204.

As shown in FIG. 2, the controller 20 of the laser cutting device 10 includes a cutting program execution unit 201, a diagnosis performance determination unit 202, a diagnosis function performance unit 203, a laser output control unit 204, a servo control processing unit 205, a switch 206, a state monitor unit 207, a storage unit 208, a notification operation determination unit 209, a notification unit 210 serving as a second notification unit and a notification unit 211 serving as a first notification unit.

Parts or all of the cutting program execution unit 201, the diagnosis performance determination unit 202, the diagnosis function performance unit 203, the laser output control unit 204, the servo control processing unit 205, the switch 206, the state monitor unit 207, the storage unit 208 and the notification operation determination unit 209 may be integrated. For example, the cutting program execution unit 201 and the diagnosis function performance unit 203 or the cutting program execution unit 201, the diagnosis performance determination unit 202 and the diagnosis function performance unit 203 can be integrated. In such a case, the switch 206 does not need to be provided. The state monitor unit 207 and the storage unit 208 may be provided outside the controller 20. For example, when the monitor data of the state monitor unit 207 is output to the outside of the controller 20, the storage unit 208 does not need to be provided. When the notification function is not provided, the notification operation determination unit 209 and the notification unit 210 do not need to be provided. The notification operation determination unit 209 and the notification unit 210 may be provided outside the controller 20.

The cutting program execution unit 201 outputs, according to the cutting program, an axis movement command to the servo control processing unit 205, and outputs the laser output command to the laser output control unit 204. The servo control processing unit 205 receives the axis movement command so as to output a movement command to the servo amplifier 30 such that the cutting nozzle 70 is moved along the cutting path commanded by the cutting program. The laser output control unit 204 receives the laser output command so as to output an output command to the laser oscillator 40.

When the laser oscillator 40 satisfies a (preset) predetermined operation condition, the diagnosis performance determination unit 202 determines, based on the cutting program, whether or not the laser oscillator is diagnosed. When the laser oscillator is diagnosed, the diagnosis performance determination unit 202 feeds a performance instruction signal to the diagnosis function performance unit 203. When the laser oscillator is diagnosed, the diagnosis performance determination unit 202 feeds a switching signal to the switch 206.

The operation condition is, for example, a predetermined energization time of the laser oscillator or a predetermined number of times the cutting program is executed. The predetermined energization time of the laser oscillator is a time during which the power supply of the laser oscillator is on. When the operation condition is set to the predetermined energization time of the laser oscillator, the energization time of the laser oscillator is managed, and thus it is possible to periodically grasp the state of the operation in the laser cutting, with the result that the diagnosis function can be performed at more accurate intervals. When the operation condition is set to the predetermined number of times the cutting program is executed, the diagnosis function of the laser oscillator can be performed every predetermined number of works, and thus the quality control of a work cut surface can be performed every predetermined number thereof.

A case where the laser oscillator is diagnosed based on the cutting program applies to, for example, a case of before (in particular, immediately before) the start of the execution of the cutting program, a case of after (in particular, immediately after) the completion of the execution of the cutting program, a case where although the cutting program is being executed, the cutting can be interrupted and the like. As an example of the case where although the cutting program is being executed, the cutting can be interrupted, a case can be mentioned where while a plurality of holes are being drilled in the work, cutting on one hole is completed but the subsequent drilling cutting is about to be performed. The diagnosis performance determination unit 202 automatically analyzes and determines a processing completion command block in the cutting program, and thereby can perform the diagnosis function of the laser oscillator after the completion of the processing.

The switch 206 receives the switching signal from the diagnosis performance determination unit 202 so as to switch the connection of the laser output control unit 204 from the cutting program execution unit 201 to the diagnosis function performance unit 203. After the completion of the diagnosis of the laser oscillator 40, the switch 206 receives the switching signal from the diagnosis performance determination unit 202 so as to switch the connection of the laser output control unit 204 from the diagnosis function performance unit 203 to the cutting program execution unit 201.

The diagnosis function performance unit 203 receives the performance instruction signal from the diagnosis performance determination unit 202 so as to output the laser output command for diagnosis of the laser oscillator to the laser oscillator 40. The laser output command for diagnosis may be a laser output command for providing an instruction to produce a constant output or may be a laser output command for outputting a plurality of laser output commands stepwise in which laser outputs are different. As described above, the diagnosis function performance unit 203 outputs a plurality of laser output commands stepwise in which laser outputs are different, and thus a command for transition from the standby state (shimmer state) of the excitation power supply to the maximum rated output is divided into an arbitrary number of steps so as to be issued. Consequently, the actual output of the laser oscillator is measured, and thus the characteristic of the laser output in each of the divided commands is grasped. The switching between the laser output command from the cutting program execution unit 201 to the laser oscillator 40 and the laser output command for diagnosis from the diagnosis function performance unit 203 is not limited to the case where the switching is performed by the switching signal fed from the diagnosis performance determination unit 202 to the switch 206. For example, the switching may be performed by a switching signal which is fed to the switch 206 from the diagnosis function performance unit 203 that receives a signal from the diagnosis performance determination unit 202.

When the diagnosis function performance unit 203 can generate the laser output command for diagnosis of the laser oscillator 40 without receiving a signal from the diagnosis performance determination unit 202, the diagnosis function performance unit 203 does not need to receive the signal from the diagnosis performance determination unit 202. In this case, the diagnosis performance determination unit 202 needs to perform only the switching of the switch 206. The state monitor unit 207 receives the laser output value from the power sensor of the laser oscillator 40 so as to monitor the state of the laser oscillator. The state of the laser oscillator is, for example, the lowering of the laser output. The state monitor unit 207 may perform the state monitoring by receiving, from the laser oscillator 40, in addition to the laser output value, one or a plurality of an excitation power supply shimmer voltage, a simmer current, a drive current, a drive voltage, a scattered light intensity and a reflected light intensity. The laser output value, the shimmer voltage, the simmer current, the drive current, the drive voltage, the scattered light intensity, the reflected light intensity and the like serve as data indicating the state of the laser oscillator. The intensities of the scattered light and the reflected light can be detected by light sensors arranged at a plurality of places within the optical system of the laser oscillator.

The state monitor unit 207 stores, in the storage unit 208, the data indicating the state of the laser oscillator such as the laser output value. When the laser output value is output from the state monitor unit 207 to the outside of the laser cutting device, the state monitor unit 207 outputs not only the data such as the laser output value but also the identification information of the laser cutting device. The notification operation determination unit 209 reads the data indicating the state of the laser oscillator such as the laser output value stored in the storage unit 208 so as to determine whether or not the data falls outside the range of a predetermined threshold value, and when the data falls outside the range, the notification operation determination unit 209 operates the notification unit 210. The notification unit 210 can use a device for providing notification by sound, light, vibration, a display or the like, and a speaker which issues a warning sound, a lit or flashing LED, a vibrating vibrator or a liquid crystal display element or the like can be used as the notification unit 210.

When in the data acquired by the diagnosis function, for example, the drive current of the excitation power supply for obtaining a specified laser light output intensity exceeds a threshold value, degradation of a light source module for outputting the laser light is estimated. Based on characteristic data collected and stored by the state monitor unit 207, the notification operation determination unit 209 performs diagnosis, and the notification unit 210 provides notification and thus it is possible to perform the exchange of the module or the like before a complete failure occurs, with the result that the operation rate of the laser cutting device is enhanced.

When timing with which the controller 20 automatically performs the diagnosis function based on the operation condition of the laser oscillator is about to be reached, the diagnosis performance determination unit 202 may use the notification unit 211 to notify the operator of the performance of the diagnosis. When as described above, it is determined that the diagnosis function of the laser oscillator is automatically performed shortly, the diagnosis performance determination unit 202 notifies the operator of the performance of the diagnosis, and thus information for determining whether the diagnosis function is automatically performed or is manually performed with arbitrary timing is provided, with the result that it is possible to provide convenience to the examination of a setup step. The notification unit 211 can perform the notification to the operator by using a display element such as a liquid crystal display element. The notification unit 211 may be formed with the same device as the notification unit 210. The notification unit 211 can also be used as the notification unit 210.

Figure 3:
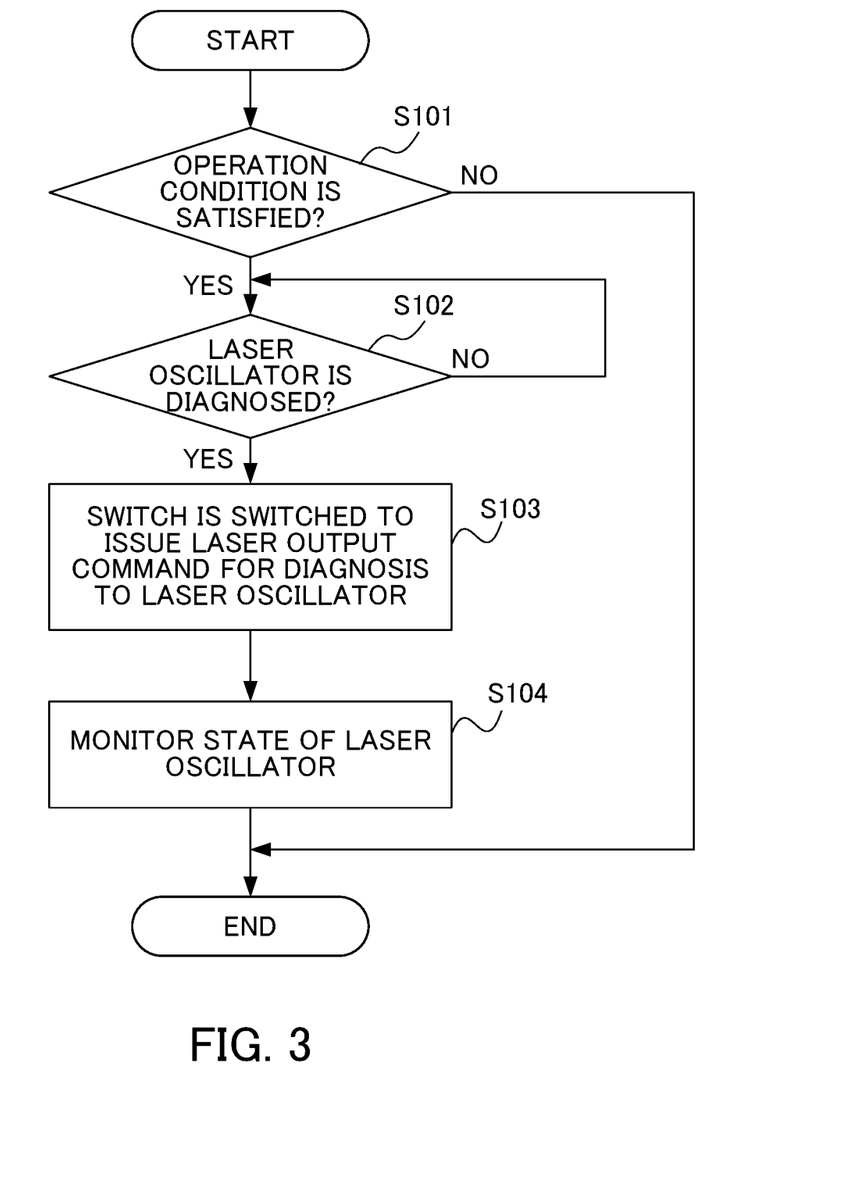
FIG. 3 is a flowchart showing the operation of the controller in the laser cutting device of the first embodiment.

FIG. 3 is a flowchart showing the operation of the controller in the laser cutting device of the first embodiment. Here, the operation of the notification operation determination unit 209 is omitted. First, in step S101, the diagnosis performance determination unit 202 determines whether or not the predetermined operation condition is satisfied. For example, the operation condition is whether or not the predetermined energization time of the laser oscillator is exceeded.

When in step S101, the operation condition is satisfied (yes in step S101), in step S102, the diagnosis performance determination unit 202 determines whether or not the laser oscillator is diagnosed. For example, when the execution of the cutting program has been completed, the diagnosis performance determination unit 202 determines that the laser oscillator is diagnosed. When the laser oscillator is diagnosed (yes in step S102), in step S103, the diagnosis performance determination unit 202 switches the switch 206 so as to switch the connection of the laser output control unit 204 from the cutting program execution unit 201 to the diagnosis function performance unit 203. The diagnosis function performance unit 203 receives the performance instruction signal from the diagnosis performance determination unit 202 so as to issue the laser output command for diagnosis of the laser oscillator to the laser oscillator 40. Then, in step S104, the state monitor unit 207 receives the data such as the laser output value from the power sensor of the laser oscillator 40 so as to monitor the state of the laser oscillator. The state of the laser oscillator is, for example, the lowering of the laser output.

When in step S101, the operation condition is not satisfied (no in step S101), the processing is completed. When in step S102, the laser oscillator cannot be diagnosed (yes in step S102), the determination in step S102 is performed again after a given time elapses.

In the present embodiment, the controller 20 includes the cutting program execution unit 201, the diagnosis performance determination unit 202, the diagnosis function performance unit 203, the laser output control unit 204 and the servo control processing unit 205, and thereby can obtain the following effects.

(1) Although in the performance of the diagnosis function of the operator, the interval of the performance of the diagnosis is likely to be irregular, the controller automatically performs the diagnosis, and thus the characteristic can be acquired substantially periodically.

(2) In general, the laser cutting device when the cutting program is executed is in a state where safety devices such as a device for preventing scattered light at the time of the output of the laser light and a device for protection against an entry around the device function effectively. Hence, the laser oscillator is diagnosed based on the cutting program, and thus the controller safely and automatically performs the diagnosis function without addition of an operation and facilities, and thereby can acquire and record the output characteristic.

(3) The controller can perform the diagnosis function periodically and automatically, and thus even when a failure occurs in the laser oscillator, it is possible to grasp the operation condition before the failure, with the result that it is possible to find the cause and grasp the condition before the failure.

Second Embodiment

Figure 4:
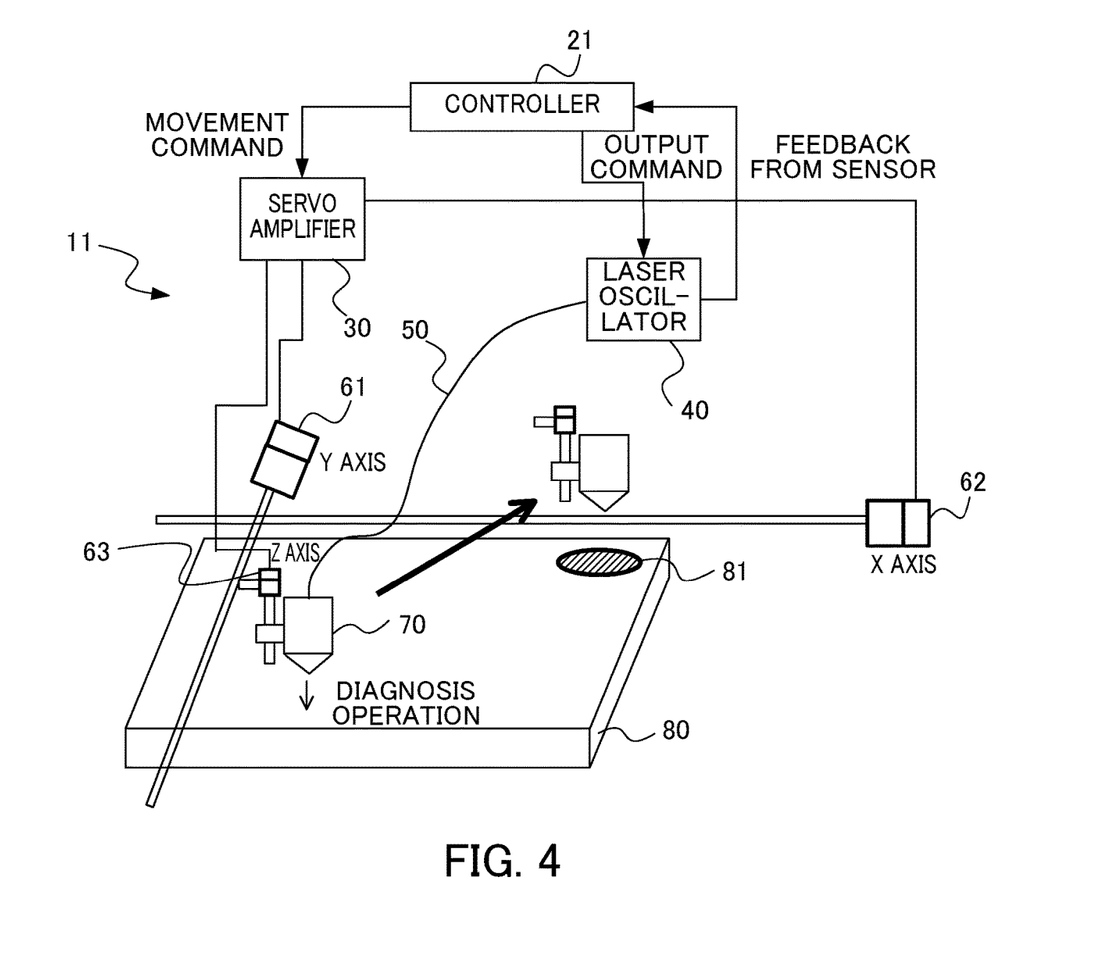
FIG. 4 is a configuration diagram showing the configuration of a second embodiment of the laser cutting device of the present invention.
Figure 5:
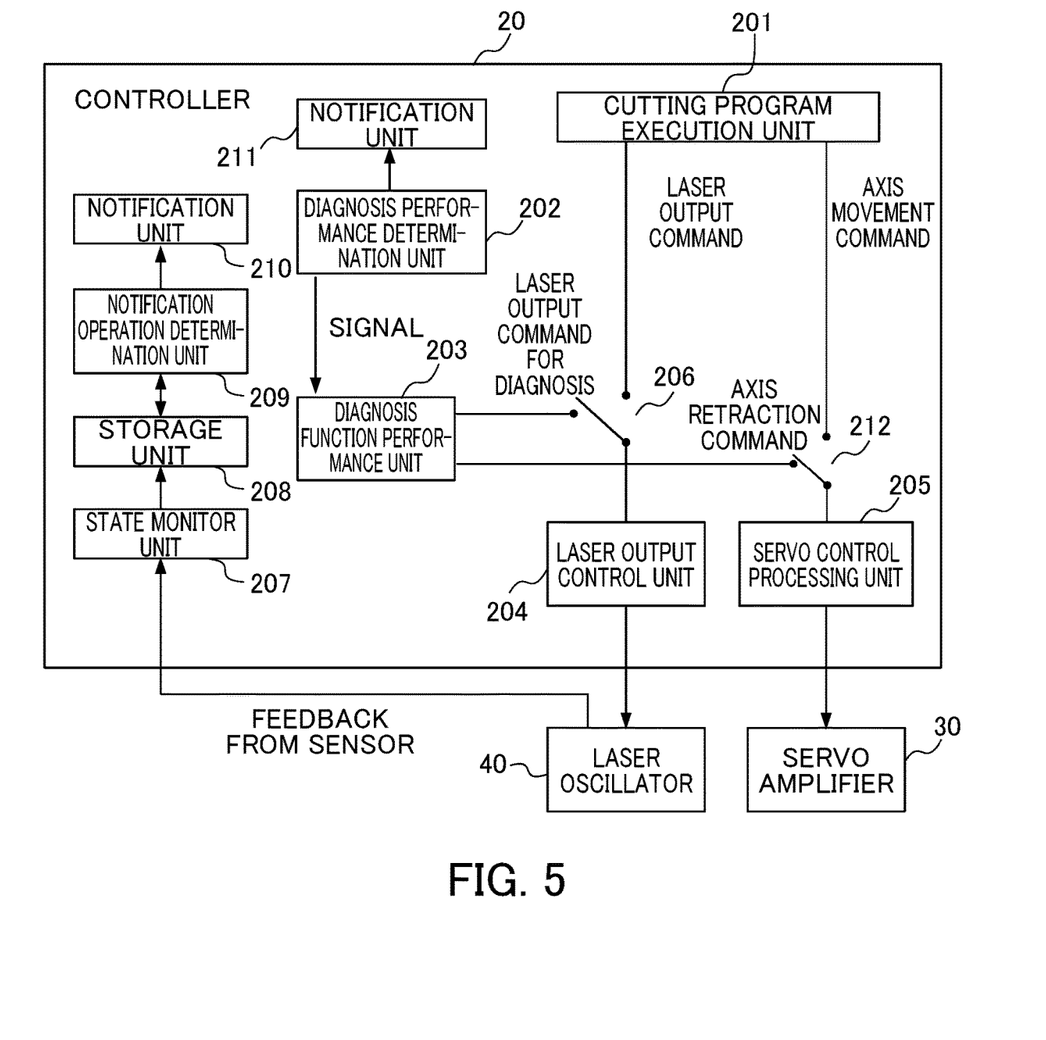
FIG. 5 is a block diagram showing the configuration of a controller in the laser cutting device of the second embodiment.
Figure 6:
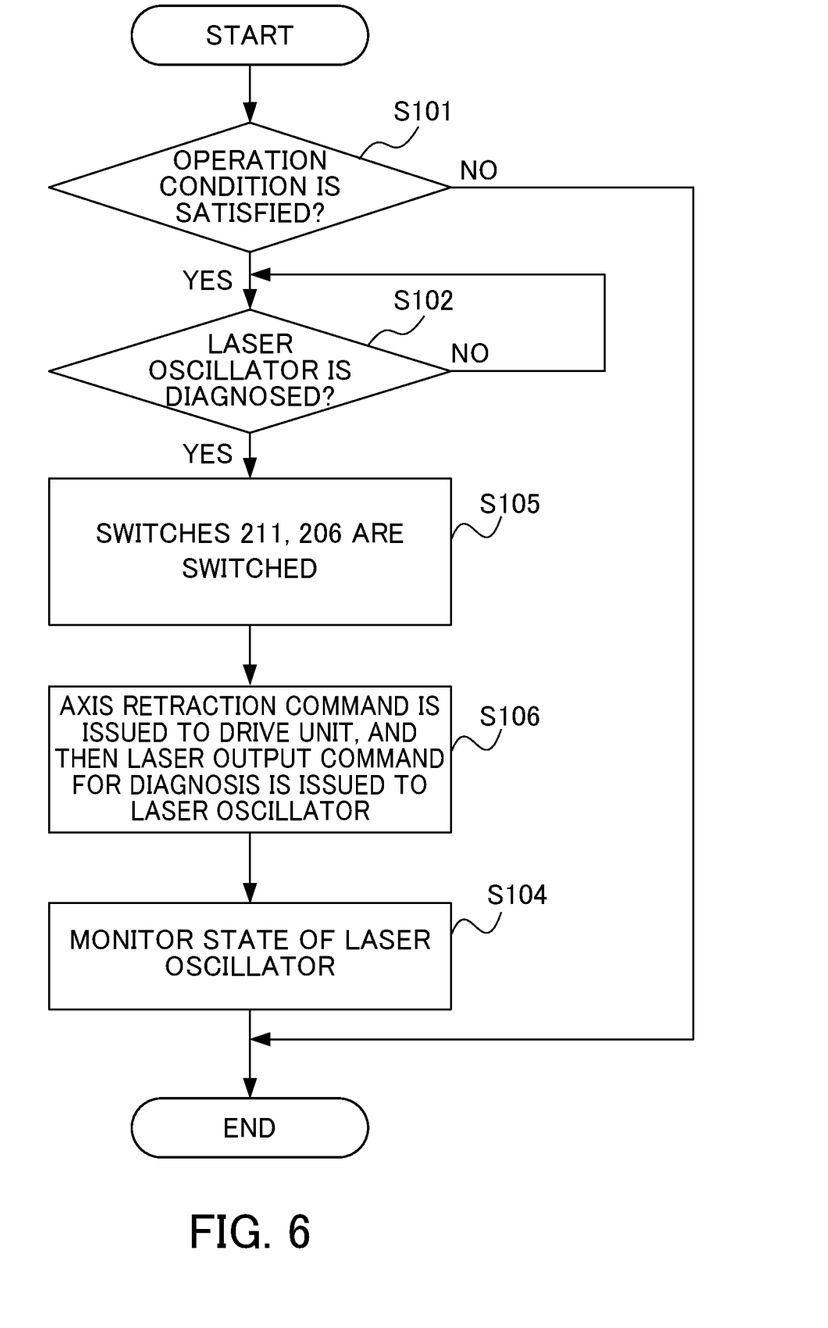
FIG. 6 is a flowchart showing the operation of the controller in the laser cutting device of the second embodiment.

FIG. 4 is a configuration diagram showing the configuration of a second embodiment of the laser cutting device of the present invention. FIG. 5 is a block diagram showing the configuration of a controller in the laser cutting device of the second embodiment. FIG. 6 is a flowchart showing the operation of the controller in the laser cutting device of the second embodiment. In FIGS. 4, 5 and 6, the same configuration units as the configuration units shown in FIGS. 1, 2 and 3 are identified with the same reference numerals, and the description thereof will be omitted. As compared with the controller 20 shown in FIG. 2, the laser cutting device 11 of the present embodiment differs from the laser cutting device 10 of the first embodiment in that as shown in FIG. 5, a controller 21 includes a switch 212 which is controlled by the diagnosis performance determination unit 202. In the operation of the laser cutting device 11 of the present embodiment, as shown in FIG. 6, instead of step S103 of FIG. 3, steps S105 and S106 are inserted. In step S105, the diagnosis performance determination unit 202 switches the switches 212 and 206. Then, in step S106, the diagnosis function performance unit 203 issues an axis retraction command to the servo control processing unit 205, and thereafter issues the laser output command for diagnosis to the laser oscillator. Specifically, when in step S105, the operation condition is satisfied, and the diagnosis performance determination unit 202 determines that the laser oscillator 40 is diagnosed, the diagnosis performance determination unit 202 switches the switch 212 so as to switch the connection of the servo control processing unit 205 from the cutting program execution unit 201 to the diagnosis function performance unit 203. The diagnosis performance determination unit 202 switches the switch 206 so as to switch the connection of the laser output control unit 204 from the cutting program execution unit 201 to the diagnosis function performance unit 203.

In step S106, the diagnosis function performance unit 203 receives the performance instruction signal from the diagnosis performance determination unit 202 so as to issue, to the servo control processing unit 205, the axis retraction command such that the drive unit (that is, the servo amplifier 30, the Y axis direction drive servomotor 61, the X axis direction drive servomotor 62 and the Z axis direction drive servomotor 63) retracts the cutting nozzle 70 to a predetermined retraction region 81. Thereafter, the diagnosis function performance unit 203 issues the laser output command for diagnosis of the laser oscillator to the laser oscillator 40. The switching of the switches 206 and 212 is not limited to the case where the diagnosis performance determination unit 202 feeds the switching signal to the switches 206 and 212. For example, the diagnosis function performance unit 203 which receives a signal from the diagnosis performance determination unit 202 may feed the switching signal to the switches 206 and 212.

When the diagnosis function of the laser oscillator 40 is performed, the laser light is emitted. Here, there is no problem if the work (which is also referred to as the workpiece) is not present in the position of the cutting nozzle 70 when the diagnosis function is performed or the work is in a position in which the drilling is completed. However, otherwise, the surface or the cross section of the work on which the cutting processing has been completed may be affected. The laser cutting device of the present embodiment has not only the effects which can be realized by the laser cutting device of the first embodiment but also an effect in which the cutting nozzle 70 is automatically moved to the predetermined retraction region 81 before the diagnosis function is performed, and in which thus it is possible to perform the diagnosis function more safely and automatically while reducing the possibility that the processed work is damaged.

Third Embodiment

Figure 7:
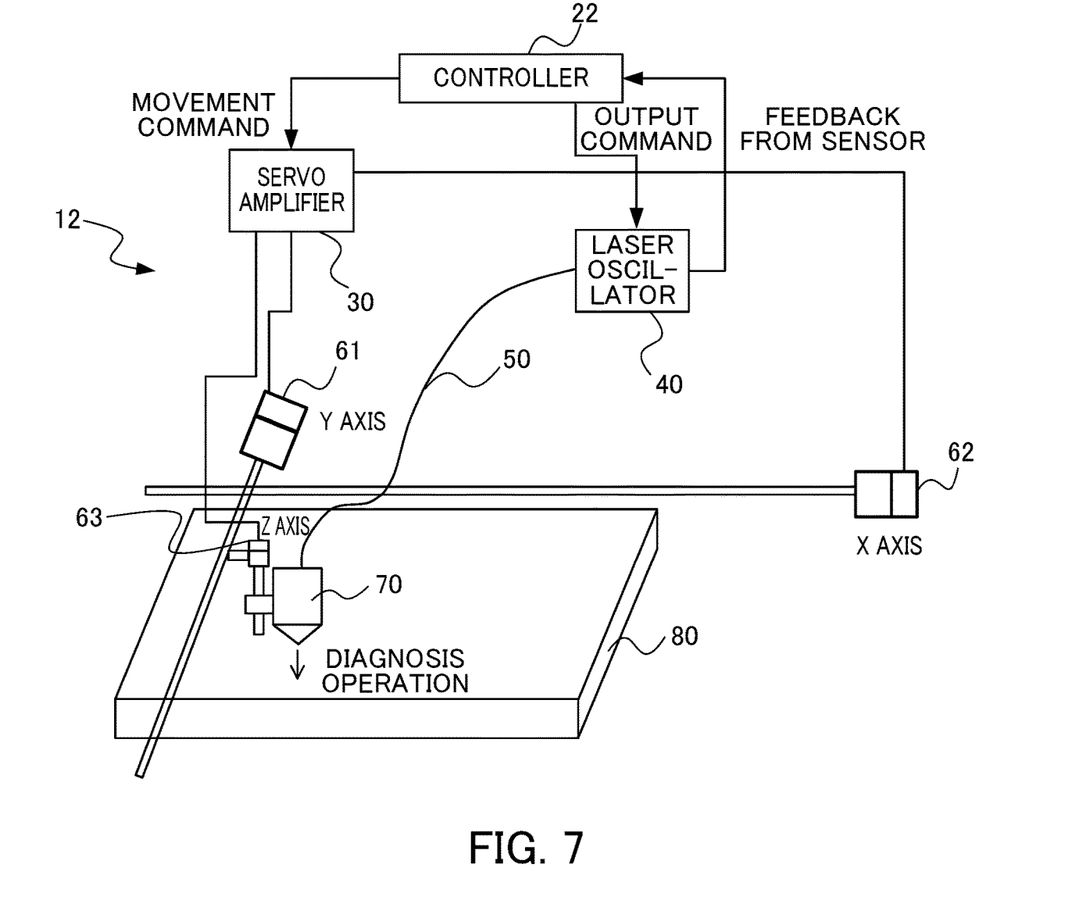
FIG. 7 is a configuration diagram showing the configuration of a third embodiment of the laser cutting device of the present invention.
Figure 8:
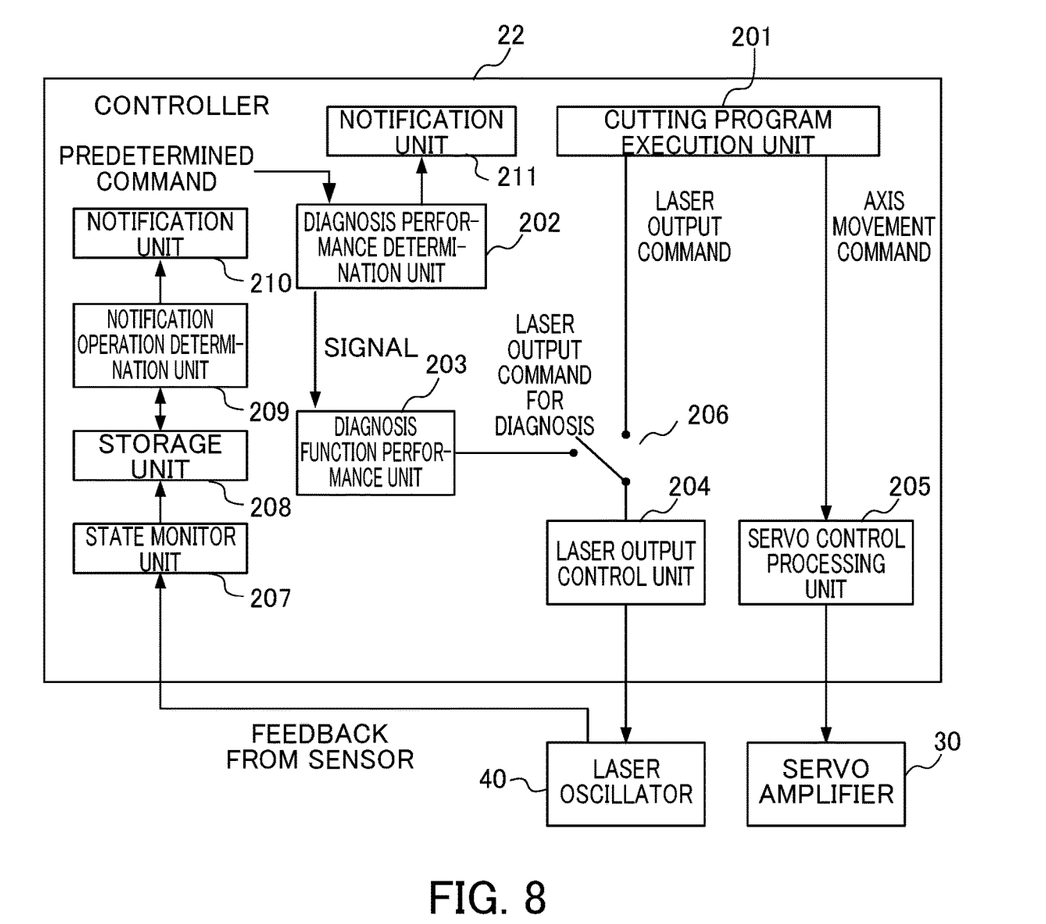
FIG. 8 is a block diagram showing the configuration of a controller in the laser cutting device of the third embodiment.

FIG. 7 is a configuration diagram showing the configuration of a third embodiment of the laser cutting device of the present invention. FIG. 8 is a block diagram showing the configuration of a controller in the laser cutting device of the third embodiment. In FIGS. 7 and 8, the same configuration units as the configuration units shown in FIGS. 1 and 2 are identified with the same reference numerals, and the description thereof will be omitted. In the laser cutting device 12 of the present embodiment, when the diagnosis performance determination unit 202 detects a predetermined command in the cutting program, the diagnosis performance determination unit 202 determines that the laser oscillator 40 is diagnosed. Then, when the predetermined operation condition is satisfied, the diagnosis performance determination unit 202 feeds the switching signal to the switch 206 so as to switch the connection of the laser output control unit 204 from the cutting program execution unit 201 to the diagnosis function performance unit 203. The diagnosis function performance unit 203 receives the performance instruction signal from the diagnosis performance determination unit 202 so as to issue the laser output command for diagnosis of the laser oscillator to the laser oscillator 40. The switching of the switch 206 is not limited to the case where the switching is performed by the switching signal fed to the switch 206 by the diagnosis performance determination unit 202. For example, the switching of the switch 206 may be performed by the switching signal fed to the switch 206 by the diagnosis function performance unit 203 which receives a signal from the diagnosis performance determination unit 202.

The configuration of the present embodiment can also be applied to the second embodiment, and when the diagnosis performance determination unit 202 detects the predetermined command in the cutting program, and the predetermined operation condition is satisfied, the diagnosis performance determination unit 202 switches the switch 212 so as to switch the connection of the servo control processing unit 205 from the cutting program execution unit 201 to the diagnosis function performance unit 203. The diagnosis performance determination unit 202 also switches the switch 206 so as to switch the connection of the laser output control unit 204 from the cutting program execution unit 201 to the diagnosis function performance unit 203. The switching of the switches 206 and 212 is not limited to the case where the diagnosis performance determination unit 202 feeds the switching signal to the switches 206 and 212. For example, the diagnosis function performance unit 203 which receives a signal from the diagnosis performance determination unit 202 may feed the switching signal to the switches 206 and 212.

According to the present embodiment, not only the effects which can be realized by the laser cutting device of the first embodiment but also the following effects are achieved. For example, the controller can perform the diagnosis function even with arbitrary timing in the execution of the cutting program, and thus it is possible to acquire the characteristic with more flexible timing. In a cutting program which is so long as to need a long time to complete the execution, both in the middle of the execution of the program and at the time of the completion thereof, a plurality of characteristics can be acquired, compared and confirmed.

Although the embodiments of the present invention are described above, the laser cutting device of each of the embodiments may automatically perform the diagnosis function when the cutting program is executed in a preset time zone. In a busy time zone, even when the predetermined operation condition is satisfied, and the laser oscillator can be diagnosed, the diagnosis performance determination unit 202 preferably avoids the diagnosis operation. In this way, in the laser cutting device, even when the diagnosis function of the laser oscillator is performed, a performance time zone in one day is previously set, and thus it is possible to perform the diagnosis function while avoiding the busy time zone, with the result that the operation rate of the laser oscillator is enhanced.

The laser cutting device of each of the embodiments may automatically perform the diagnosis function of the controller when the laser cutting device is started up. In this way, when the power supply of the laser cutting device is turned on so as to start up the system, the laser cutting device first automatically performs the diagnosis function so as to reliably acquire the characteristic each time the system is started up, with the result that the operator can grasp the transition of the state of the laser oscillator.

The laser cutting device of each of the embodiments may automatically perform the diagnosis function of the controller when the laser cutting device is stopped. In this way, the laser cutting device automatically performs the diagnosis function before the power supply of the laser cutting device is turned off so as to stop the system, and thus the laser cutting device reliably acquires the characteristic each time the system is stopped, with the result that the operator can grasp the transition of the state of the laser oscillator.

Furthermore, the laser cutting device of each of the embodiments may perform the diagnosis function when the laser oscillator of the laser cutting device is in a predetermined state. For example, when the internal temperature of the laser oscillator of the laser cutting device or the temperature of cooling water is in a predetermined state, the laser cutting device performs the diagnosis function, and thus the operator can grasp the transition of the characteristic caused by a chronological change under certain conditions.

The predetermined state of the laser oscillator includes a state where when the laser oscillator is properly operated, the temperature within the oscillator or the temperature of the cooling water falls within a certain range in a normal range. The predetermined state of the laser oscillator includes, for example, a state where when the laser oscillator is in the predetermined state, the temperature of the cooling water does not exceed an upper limit value but is slightly higher than a standard value and a case where the temperature of the cooling water does not exceed a lower limit value but is slightly lower than the standard value. As described above, the laser cutting device can perform the diagnosis function in a uniform state within the certain range in the normal range. In this way, the laser cutting device constantly makes a measurement under certain environmental conditions so as to enhance accuracy in comparison with the previous state.

All or part of the controller in the laser cutting device of the embodiments described above can be realized by hardware, software or a combination thereof. Here, the realization by software means that a computer reads and executes programs so as to achieve the realization. When the laser cutting device is formed with hardware, part or all of the controller shown in FIG. 2, 5 or 8 can be formed with, for example, a circuit which includes an integrated circuit (IC) such as a LSI (Large Scale Integrated circuit), an ASIC (Application Specific Integrated Circuit), a gate array or an FPGA (Field Programmable Gate Array).

When all or part of the controller in the laser oscillator is formed with software, the function of the configuration of all or part of the controller shown in FIG. 2, 5 or 8 and all or part of the operation of the controller shown in the flowchart of FIG. 3 or 6 can be described in programs. The computer is formed with a storage unit, such as a hard disc or a ROM, which stores the programs, a DRAM which stores data necessary for computation, a CPU and buses which connect individual units. In the computer described above, information necessary for computation is stored in the DRAM, the programs are operated in the CPU and thus all or part of the operation of the controller is realized.

The programs are stored with various types of computer readable media, and can be supplied to the computer. The computer readable media include non-transitory computer readable media. The computer readable media include various types of tangible recording media. The non-transitory computer readable media include magnetic recording media (for example, a flexible disc and a hard disc drive), magneto-optical recording media (for example, a magneto-optical disc), a CD-ROM (Read Only Memory), a CD-R, a CD-R/W, a semiconductor memory (for example, a mask ROM and a PROM (programmable ROM), an EPROM (Erasable PROM), a flash ROM and a RAM (random access memory).

EXPLANATION OF REFERENCE NUMERALS

10 laser cutting device
20 controller 30 servo amplifier
40 laser oscillator
50 light guide fiber
61 Y axis direction drive servomotor
62 X axis direction drive servomotor
63 Z axis direction drive servomotor
70 cutting nozzle
80 work cutting table
81 retraction region
201 cutting program execution unit
202 diagnosis performance determination unit
203 diagnosis function performance unit
204 laser output control unit
205 servo control processing unit
212, 206 switch
207 state monitor unit
208 storage unit
209 notification operation determination unit
210 notification unit (second notification unit)
211 notification unit (first notification unit)

What is claimed is:

1. A laser cutting device comprising:
a laser oscillator configured to generate laser light;
a cutting nozzle configured to irradiate a work with the laser light supplied from the laser oscillator so as to cut the work; and
a controller configured to control the laser oscillator and a drive unit configured to move the cutting nozzle along a cutting path commanded by a cutting program,
wherein the controller includes:
a laser output control unit configured to issue a laser output command to the laser oscillator;
a diagnosis performance determination unit configured to determine whether or not the laser oscillator satisfies a predetermined operation condition, determine whether or not a temperature within an oscillator of the laser oscillator or a temperature of a cooling water falls within a certain range that is in a normal range having an upper limit and a lower limit, and determine, based on the cutting program, whether or not the laser oscillator is to be diagnosed; and
a diagnosis function performance unit configured to issue a laser output command for performing diagnosis of the laser oscillator to the laser oscillator, and
when the diagnosis performance determination unit determines that the laser oscillator satisfies the predetermined operation condition, determines that the temperature within the oscillator of the laser oscillator or the temperature of the cooling water falls within the certain range in the normal range, and determines, based on the cutting program, that the laser oscillator is to be diagnosed, the diagnosis performance determination unit outputs the laser output command for performing diagnosis to the laser oscillator,
the operation condition is a predetermined energization time of the laser oscillator or a predetermined number of times the cutting program is executed.

2. The laser cutting device according to claim 1, wherein when the diagnosis performance determination unit determines that the laser oscillator is to be diagnosed, the controller controls the drive unit so as to retract the cutting nozzle to a predetermined retraction region.

3. The laser cutting device according to claim 1, wherein when the diagnosis performance determination unit detects a predetermined diagnose performance command while the cutting program is being processed, the diagnosis performance determination unit outputs the laser output command for performing diagnosis to the laser oscillator.

4. The laser cutting device according to claim 1, further comprising: a notification unit configured to notify performance of the diagnosis to an operator when the operation condition is about to be satisfied.

5. The laser cutting device according to claim 1, wherein when the diagnosis function performance unit issues the laser output command for performing diagnosis, the diagnosis function performance unit outputs a plurality of laser output commands stepwise in which laser outputs are different.

6. The laser cutting device according to claim 1, further comprising:
a state monitor unit configured to monitor a state of the laser oscillator;
a storage unit configured to store data that is output from the state monitor unit and that indicates the state of the laser oscillator;
a notification unit; and
a notification operation determination unit configured to determine whether or not the data falls outside a predetermined threshold value range, and configured to operate the notification unit when determining that the data falls outside the predetermined threshold value range.

7. A method of diagnosing a laser oscillator of a laser cutting device, the laser cutting device including:
the laser oscillator configured to generate laser light;
a cutting nozzle configured to irradiate a work with the laser light supplied from the laser oscillator so as to cut the work; and
a drive unit configured to move the cutting nozzle along a cutting path commanded by a cutting program,
the method comprising:
determining whether or not the laser oscillator satisfies a predetermined operation condition, determining whether or not a temperature within an oscillator of the laser oscillator or a temperature of a cooling water falls within a certain range that is in a normal range having an upper limit and a lower limit, and determining whether or not the laser oscillator is to be diagnosed based on the cutting program, and
when the laser oscillator satisfies the predetermined operation condition, the temperature within the oscillator of the laser oscillator or the temperature of the cooling water falls within the certain range in the normal range, and the laser oscillator is to be diagnosed based on the cutting program, issuing a laser output command for performing diagnosis of the laser oscillator to the laser oscillator,
wherein the operation condition is a predetermined energization time of the laser oscillator or a predetermined number of times the cutting program is executed.

8. A non-transitory computer readable recording medium encoded with a program for performing diagnosis of a laser oscillator, the program causing a computer to serve as a controller of a laser cutting device including:
a laser oscillator configured to generate laser light;
a cutting nozzle configured to irradiate a work with the laser light supplied from the laser oscillator so as to cut the work; and
the controller configured to control the laser oscillator and a drive unit configured to move the cutting nozzle along a cutting path commanded by a cutting program,
the program for performing diagnosis causing the computer to function as:

a laser output control unit configured to issue a laser output command to the laser oscillator, a diagnosis performance determination unit configured to determine whether or not the laser oscillator satisfies a predetermined operation condition, determine whether or not a temperature within an oscillator of the laser oscillator or a temperature of a cooling water falls within a certain range that is in a normal range having an upper limit and a lower limit, and determine, based on the cutting program, whether or not the laser oscillator is to be diagnosed, and a diagnosis function performance unit configured to issue a laser output command for performing diagnosis of the laser oscillator to the laser oscillator, the program for performing diagnosis causing the computer to function such that when the diagnosis performance determination unit determines that the laser oscillator satisfies the predetermined operation condition, determines that the temperature within the oscillator of the laser oscillator or the temperature of the cooling water falls within the certain range in the normal range, and determines, based on the cutting program, that the laser oscillator is to be diagnosed, the diagnosis performance determination unit outputs the laser output command for performing diagnosis to the laser oscillator, wherein the operation condition is a predetermined energization time of the laser oscillator or a predetermined number of times the cutting program is executed.

* * * * *